(12) United States Patent
Oda et al.

(10) Patent No.: US 7,760,791 B2
(45) Date of Patent: Jul. 20, 2010

(54) APPARATUS FOR COMMUNICATING USING UWB TRANSMISSION

(75) Inventors: Mikio Oda, Moriyama (JP); Yuki Yoshida, Sasebo (JP)

(73) Assignee: OMRON Corporation, Kyoto (JP)

( * ) Notice: Subject to any disclaimer, the term of this patent is extended or adjusted under 35 U.S.C. 154(b) by 864 days.

(21) Appl. No.: 11/642,981

(22) Filed: Dec. 19, 2006

(65) Prior Publication Data
US 2007/0268958 A1 Nov. 22, 2007

(30) Foreign Application Priority Data
Jan. 10, 2006 (JP) ............................. 2006-002298

(51) Int. Cl.
*H04L 27/30* (2006.01)
(52) U.S. Cl. ...................... 375/130; 375/256; 375/267; 375/299; 375/346
(58) Field of Classification Search ................. 375/130, 375/256, 260, 267, 299, 340, 346
See application file for complete search history.

(56) References Cited

U.S. PATENT DOCUMENTS

2005/0129092 A1* 6/2005 Santhoff et al. ............. 375/130
2005/0201446 A1* 9/2005 Bar-Ness et al. ............ 375/130
2006/0120433 A1* 6/2006 Baker et al. ................. 375/130
2009/0268781 A1* 10/2009 Kageyama .................. 375/130

FOREIGN PATENT DOCUMENTS

| CN | 1152364 | 6/1997 |
|----|---------|--------|
| CN | 1682467 | 10/2005 |
| JP | 2005-129993 | 5/2005 |

OTHER PUBLICATIONS

CN patent application No. 200610168329, Notification of First Office Action mailed Nov. 6, 2009.

* cited by examiner

*Primary Examiner*—Dac V Ha
(74) *Attorney, Agent, or Firm*—Weaver Austin Villeneuve & Sampson LLP

(57) ABSTRACT

In one embodiment, an apparatus for communicating using UWB (ultra wideband) transmission includes a transmitter configured to transmit the UWB transmission; a receiver configured to receive the UWB transmission; and a monitor unit configured to present data representing a relationship between two types of parameters of the received UWB transmission.

20 Claims, 10 Drawing Sheets ed by reference in its entirety for all pur-
APPARATUS FOR COMMUNICATING USING UWB TRANSMISSION This application claims priority from Japanese Patent Application JP2006-002298 filed on Jan. 10, 2006, which is hereby incorporated by reference in its entirety for all purposes.

TECHNICAL FIELD

The present disclosure relates generally to apparatus for communicating using UWB (ultra wideband) transmission.

BACKGROUND

RF (radio frequency) data communications can be implemented by using various frequency bands. One example for low-power, short-distance bidirectional communications is UWB communication systems which utilizes UWB radio transmission (e.g., 3.1-10.6 GHz). Such a UWB communication system is used to establish wireless data link between a parent machine and a child machine. An example of UWB communications is described in Japanese Laid-open Patent Publication Tokukai 2005-129993.

In view of the above, it would be desirable to provide improved UWB communication systems which are capable of providing the user of the system with information relating to communication environments.

SUMMARY

The invention described herein provides an apparatus for communicating using UWB (ultra wideband) transmission. The apparatus includes a transmitter configured to transmit the UWB transmission; a receiver configured to receive the UWB transmission; and a monitor unit configured to present data representing a relationship between two types of parameters of the received UWB transmission.

These and other features and advantages of the invention will be described in more detail below with reference to associated drawings.

BRIEF DESCRIPTION OF THE DRAWINGS

The invention may best be understood by reference to the following description taken in conjunction with the accompanying drawings, which illustrate specific embodiments of the present invention. In the drawings, similar reference numerals/symbols correspond to similar elements.

DESCRIPTION OF EXAMPLE EMBODIMENTS

Overview

Figure 1:
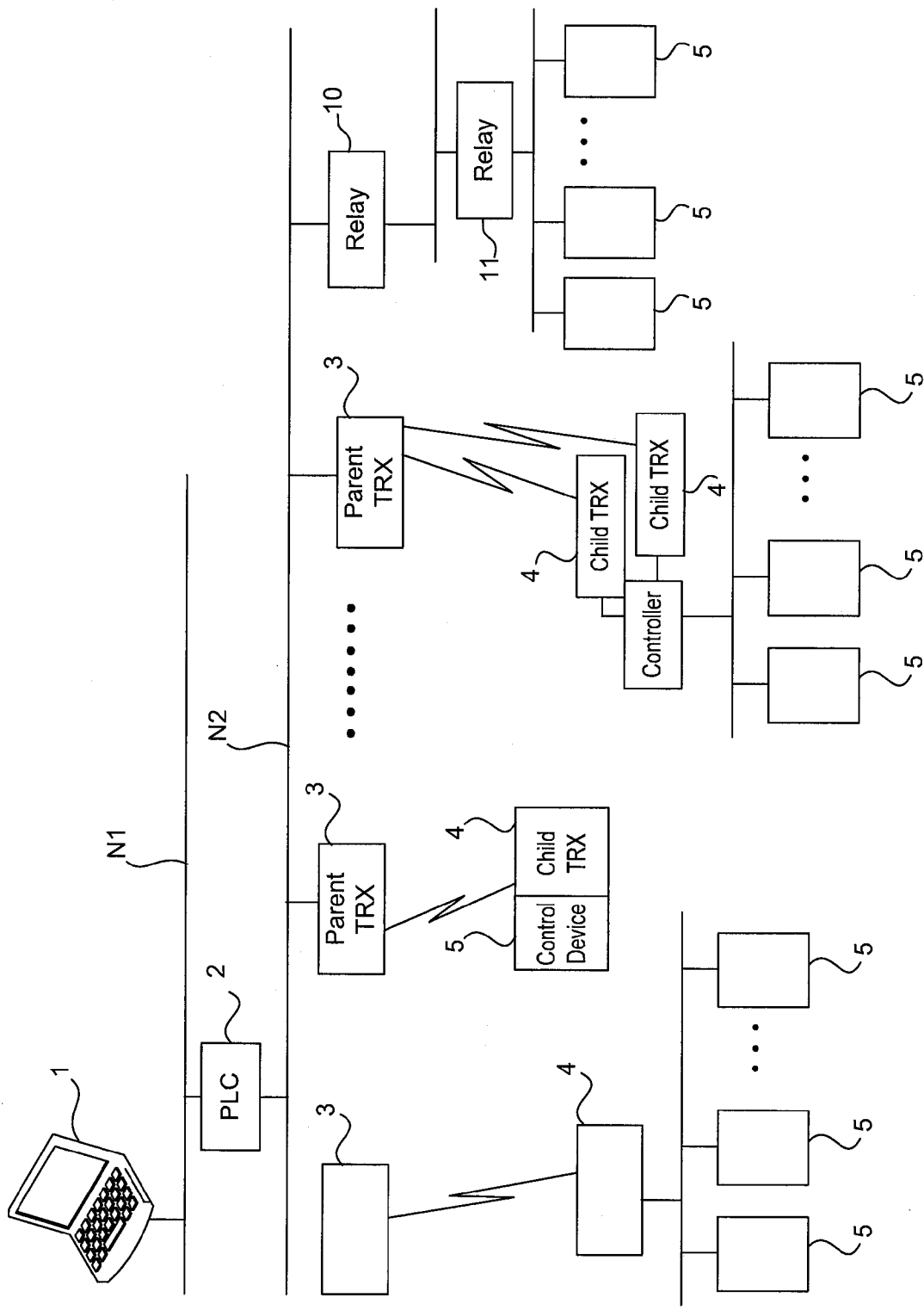
FIG. 1 illustrates a block diagram of a control system using an example embodiment of the invention.
Figure 2:
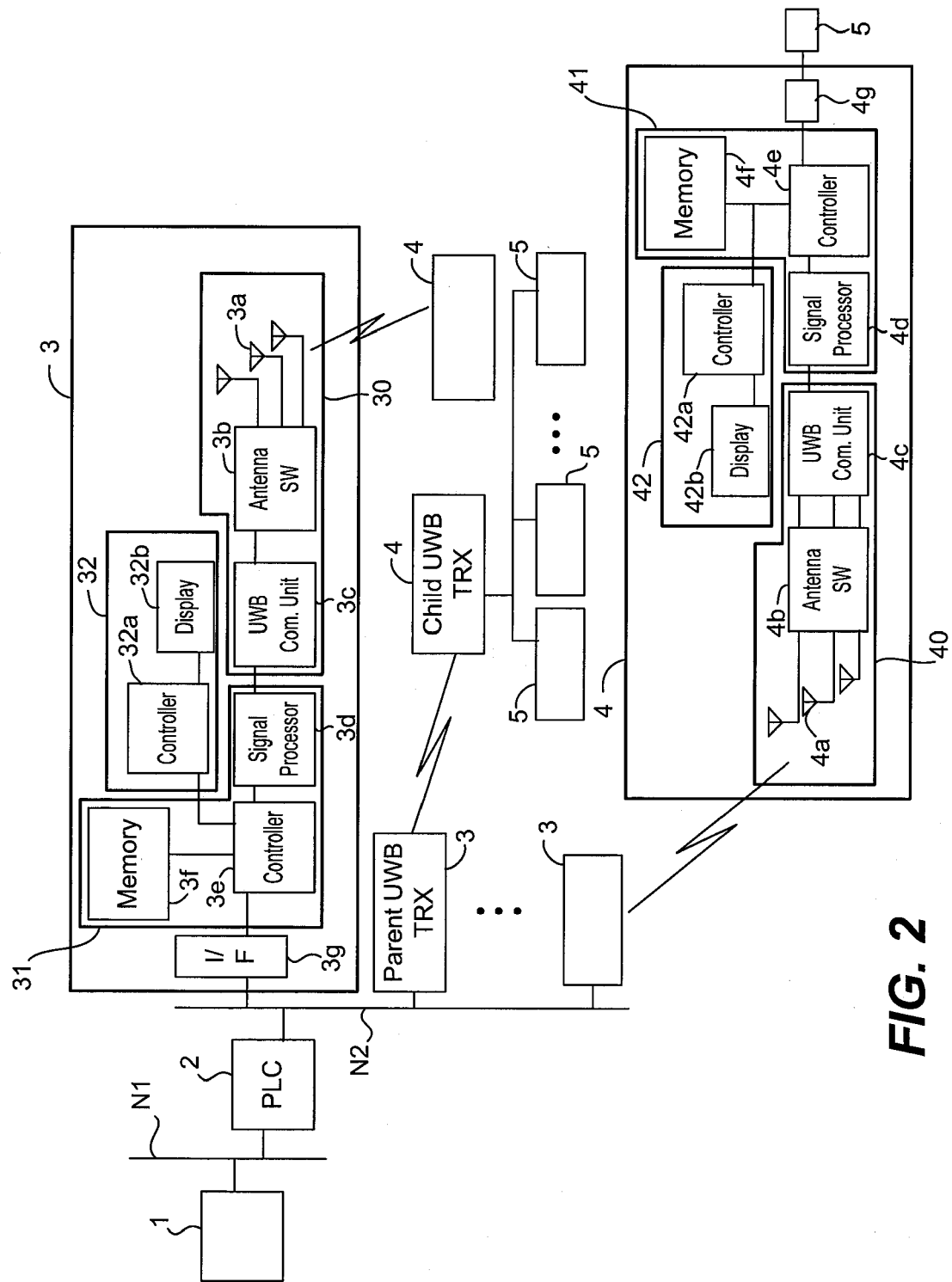
FIG. 2 illustrates a block diagram of a parent-machine-side transceiver and a child-machine-side transceiver in detail.

FIG. 1 illustrates a block diagram of a control system using an example embodiment of the invention. FIG. 2 illustrates a block diagram of a parent-machine-side transceiver and a child-machine-side transceiver in detail. A centralized control unit 1 controls the whole system shown in FIG. 1, and typically includes a microcomputer for controlling the system. The system of FIG. 1 typically includes multiple PLCs (programmable logic controllers) 2, each of which contains a microcomputer.

Parent-machine-side transceivers 3 (simply referred to as "parent transceivers 3") communicate with child-machine-side transceivers 4 (simply referred to as "child transceivers 4") using UWB (ultra wideband) RF (radio frequency) transmission (e.g., 3.1-10.6 GHz). The child transceivers 4 may have configurations and/or functions similar to those of the parent transceivers 3. Control devices 5 are locally connected to the child transceivers 4. The devices 5 are typically controlled by the centralized control unit 1 through the transceivers 3 and 4, networks N1 and N2, and the PLC 2. Examples of the control devices 5 include sensors, relays, and electric motors.

The centralized control unit 1 is connected to the PLCs 2 through a wired common network N1 such as an Ethernet. Typically, a single PLC 2 is connected to one or more parent transceivers 3 and/or an upper-side wired communication relay 10 through a dedicated network N2. This upper-side relay 10 may be connected to one or more lower-side relays 11 through a dedicated network. The lower-side network 11 is in turn connected to one or more control devices 5 through wired connections.

On the other hand, each of the parent transceivers 3 is coupled to one or more child transceivers 4 through wireless connections. Each of the child transceivers 4 is hard-wired to one or more control devices 5. As appreciate by those skilled in the art, the configuration of the system discussed throughout the present specification merely shows one example of various possible configurations of the system using the example embodiment of the invention.

The centralized control unit 1, the PLCs 2, and the parent transceivers 3 communicate with each other based on wired packet communications by using packets each of which includes a header, data and a footer. Corresponding ones of the parent transceivers 3 and the child transceiver 4 communicate with each other based on wireless packet communications by using packets each of which includes a header, data and a footer. In the example embodiment, the parent and child transceivers 3 and 4 utilize UWB communications as a means of wireless packet communications.

UWB communications utilize an extremely low-power impulse train which contains information, and enable short-distance, very high speed data transmission. One example of an access control method for UWB communications is defined in, for example, IEEE 802.15.3 as implementing packetized data transmission including preambles.

Parent Transceivers

Referring to FIG. 2, each of the parent transceivers 3 includes a communication unit 30, a processor 31, and a monitor unit 32.

The communication unit 30 includes one or more UWB antennas 3a for receiving and/or transmitting UWB RF transmission, an antenna switch 3b for switching between the multiple antennas 3a for choosing a better antenna condition, and a UWB communication unit 3c. The UWB communication unit 3c typically includes a transmitter configured to transmit the UWB transmission, and a receiver configured to receive the UWB transmission. The transmitter in the UWB communication unit 3c may be capable of modulating a data signal into a UWB signal for transmission by reverse fast fourier transform (reverse FFT). The receiver in the UWB communication unit 3c may be capable of demodulating a received UWB signal into a data signal for reception by FFT.

The processor 31 includes a signal processor 3d, a controller 3e, and a memory 3f. The signal processor 3d is configured to obtain the relationship from the UWB transmission received by the receiver. The signal processor 3d may be capable of encoding (for transmission) and/or decoding (for reception) the UWB transmission by digital signal processing.

The controller 3e is configured to control the memory 3f. In addition, the controller may be capable of controlling diversity switching of the UWB antennas 3a, controlling on/off states of RF modules, and controlling communications with the PLC 2.

The memory 3f is configured to store the data representing the relationship between two types of parameters of the received UWB transmission. Additionally, the memory 3f may be capable of storing ID numbers of the transceivers 3 and 4, and buffering RF communication data including the parameters of the received UWB transmission.

Each of the parent transceivers 3 may include an interface (I/F) 3g for the PLC 2.

The communication unit 30 in the parent transceiver 3 performs data processing related to communication parameters obtained from the UWB communications with the child transceiver 4. The processor 31 obtains data representing the relationship between various communication parameters based on the data generated by the communication unit 30. Examples of such communication parameters may include, but not limited to, a communication response time, a communication distance, a reception sensitivity, a communication speed, a noise level, a spreading ratio, an error rate, a communication channel, a number of communication channels, a channel frequency, a packet size, a disturbance field level, an amount of water drops in the air, and any other suitable parameters which relate to communication quality, communication conditions, communication setting, etc in UWB communications. Various example embodiments of the invention may present data representing any possible combination of at least two of these parameters.

In the processor 31, the signal processor 3d performs data processing to obtain the relationship between at least two communication parameters based on the data processed by the communication unit 30. The controller 3e facilitates storing in the memory 3f the obtained data representing the relationship calculated by the signal processor 3d.

The parent transceiver 3 includes a monitor unit 32 which is configured to present data representing the relationship between at least two types of the communication parameters discussed above. The monitor unit 32 may include a display 32b which is configured to visually display the data representing the relationship between the two types of the communication parameters to the user of the system. The monitor unit 32 displays the relationship between two communication parameters graphically on a screen of the display. The monitor unit 32 includes a controller 32a configured to control the display 32b, and the display 32b.

Specifically, the controller 32a in the monitor unit 32 receives data from the controller 3e in the processor 31, and retrieves the relationship between communication parameters stored in the memory 3f. Then, the controller 32a outputs the retrieved data for displaying the communication parameter relationship to the display 32b. The display 32b visually displays the communication parameter relationship on a display screen.

Child Transceivers

Referring again to FIG. 2, each of the child transceivers 4 includes a communication unit 40, a processor 41, and a monitor unit 42.

The communication unit 40 includes one or more UWB antennas 4a for receiving and/or transmitting UWB RF transmission, an antenna switch 4b for switching between the multiple antennas 4a for choosing a better antenna condition, and a UWB communication unit 4c. The UWB communication unit 4c typically includes a transmitter configured to transmit the UWB transmission, and a receiver configured to receive the UWB transmission. The transmitter in the UWB communication unit 4c may be capable of modulating a data signal into a UWB signal for transmission by reverse fast fourier transform (reverse FFT). The receiver in the UWB communication unit 4c may be capable of demodulating a received UWB signal into a data signal for reception by FFT.

The processor 41 includes a signal processor 4d, a controller 4e, and a memory 4f. The signal processor 4d is configured to obtain the relationship from the UWB transmission received by the receiver. The signal processor 4d may be capable of encoding (for transmission) and/or decoding (for reception) the UWB transmission by digital signal processing.

The controller 4e is configured to control the memory 4f. In addition, the controller may be capable of controlling diversity switching of the UWB antennas 4a, controlling on/off states of RF modules, and controlling communications with the PLC 2.

The memory 4f is configured to store the data representing the relationship between two types of parameters of the received UWB transmission. Additionally, the memory 4f may be capable of storing ID numbers of the transceivers 3 and 4, and buffering RF communication data including the parameters of the received UWB transmission.

Each of the child transceivers 4 may include an interface (I/F) 4g for the control device 5.

The communication unit 40 in the child transceiver 4 performs data processing related to communication parameters obtained from the UWB communications with the child transceiver 4. The processor 41 obtains data representing the relationship between various communication parameters based on the data generated by the communication unit 40. Examples of such communication parameters may include, but not limited to, a communication response time, a communication distance, a reception sensitivity, a communication speed, a noise level, a spreading ratio, an error rate, a communication channel, a number of communication channels, a channel frequency, a packet size, a disturbance field level, an amount of water drops in the air, and any other suitable parameters which relate to communication quality, communication conditions, communication setting, etc in UWB communications. Various example embodiments of the invention may present data representing any possible combination of at least two of these parameters.

In the processor 41, the signal processor 4*d* performs data processing to obtain the relationship between at least two communication parameters based on the data processed by the communication unit 40. The controller 4*e* facilitates storing in the memory 4*f* the obtained data representing the relationship calculated by the signal processor 4*d*.

The child transceiver 4 includes a monitor unit 42 which is configured to present data representing the relationship between at least two types of the communication parameters discussed above. The monitor unit 42 may include a display 42*b* which is configured to visually display the data representing the relationship between the two types of the communication parameters to the user of the system. The monitor unit 42 displays the relationship between two communication parameters graphically on a screen of the display. The monitor unit 42 includes a controller 42*a* configured to control the display 42*b*, and the display 42*b*.

Specifically, the controller 42*a* in the monitor unit 42 receives data from the controller 4*e* in the processor 41, and retrieves the relationship between communication parameters stored in the memory 4*f*. Then, the controller 42*a* outputs the retrieved data for displaying the communication parameter relationship to the display 42*b*. The display 42*b* visually displays the communication parameter relationship on a display screen.

System in Detail

As described above, each of the parent transceivers 3 includes the communication unit 30, the processor 31, and the monitor unit 32. Similarly, each of the child transceivers 4 includes the communication unit 40, the processor 41, and the monitor unit 42. Each of the transceivers 3 and 4 is capable of visually displaying the relationship between two communication parameters on the display 32*b*/42*b* so that, through the graphical representation of the communication parameters, the user of the system can visually obtain information regarding the relationship of the parameters.

The transceivers 3 and 4 shown in FIG. 2 may use MB-OFDM (Multiband-Orthogonal Frequency Division Multiplexing) for the UWB communications. Alternatively, the transceivers 3 and 4 may use DS-CDMA (Direct Sequence-Code Division Multiple Access) for the UWB communications. The MB-OFDM system generates and sends packets on each of frequency channels CH1-CH14 which constitute multiple subbands each having a 528 MHz bandwidth in an ultra wideband ranging from 3.1 GHz to 10.6 GHz. The DS-CDMA system uses an ultra wideband of 3.1-10.6 GHz. When transmitting UWB data, the data is channel encoded, and narrow-band modulated (i.e., primary modulation), and then, is spread by a spreading code sequence (i.e., secondary modulation) to be ultimately transmitted as UWB transmission. When receiving the UWB transmission, the received signal is first despread by the spreading code sequence. Then, it is narrow-band demodulated, and further channel decoded to generate received data.

Figure 3:
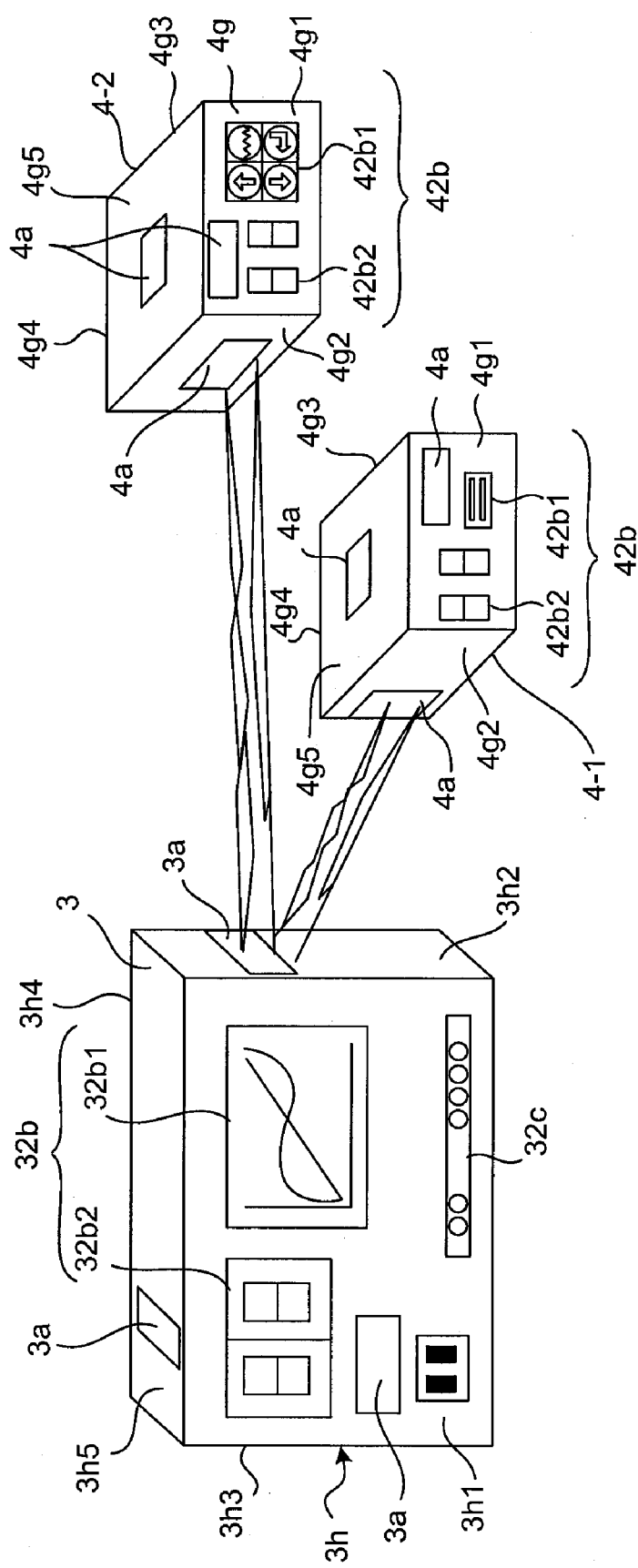
FIG. 3 illustrates a system including one parent transceiver, and two child transceivers.

FIG. 3 illustrates a system including one parent transceiver 3, and two child transceivers 4-1, and 4-2 (collectively, transceivers 4) which communicate with the parent transceiver 3. Various configurations of panels of these transceivers are now described below referring to FIG. 3.

The parent transceiver 3 includes rectangular panels. A front operation/antenna-accommodating/display panel 3*h*1 includes the UWB antenna 3*a*, the display 32*b* in the monitor unit 32, and an operation section 32*c*. The operation section 32*c* may include various switches, input devices, etc. The display 32*b* includes a primary display screen 32*b*1, and a secondary display screen 32*b*2. Each of side antenna-accommodating panels 3*h*2, 3*h*3, a back antenna-accommodating panel 3*h*4, and a top antenna-accommodating panel 3*h*5 has a UWB antenna 3*a*. In FIG. 3, the UWB antennas 3*a* provided on the panels 3*h*3, 3*h*4 are not shown. In this example, the parent transceiver 3 has five UWB antennas 3*a* on the five surfaces thereof. The primary display screen 32*b*1 shows data representing communication parameters, for example, in a two-dimensional graph. The secondary display screen 32*b*2 shows data representing communication parameters, for example, by numerical values, which can be displayed by, for example, a seven-segment display device. Any suitable number of, and any suitable positions of the UWB antennas 3*a* may be utilized depending on the actual implementation of the system.

The child transceiver 4-1 includes rectangular panels. A front operation/antenna-accommodating/display panel 4*g*1 includes the UWB antenna 4*a*, the display 42*b* in the monitor unit 42, and an operation section. The operation section may include various switches, input devices, etc. The display 42*b* includes a primary display screen 42*b*1, and a secondary display screen 42*b*2. Each of side antenna-accommodating panels 4*g*2, 4*g*3, a back antenna-accommodating panel 4*g*4, and a top antenna-accommodating panel 4*g*5 has a UWB antenna 4*a*. In FIG. 3, the UWB antennas 4*a* provided on the panels 4*g*2, 4*g*4 are not shown. In this example, the child transceiver 4 has five UWB antennas 4*a* on the five surfaces thereof. The primary display screen 42*b*1 shows data representing communication parameters, for example, in a two-dimensional graph. The secondary display screen 42*b*2 shows data representing communication parameters, for example, by numerical values, which can be displayed by, for example, a seven-segment display device. Any suitable number of, and any suitable positions of the UWB antennas 4*a* may be utilized depending on the actual implementation of the system.

The child transceiver 4-2 includes rectangular panels. A front operation/antenna-accommodating/display panel 4*g*1 includes the UWB antenna 4*a*, the display 42*b* in the monitor unit 42, and an operation section. The operation section may include various switches, input devices, etc. The display 42*b* includes a primary display screen 42*b* 1, and a secondary display screen 42*b*2. Each of side antenna-accommodating panels 4*g*2, 4*g*3, a back antenna-accommodating panel 4*g*4, and a top antenna-accommodating panel 4*g*5 has a UWB antenna 4*a*. In FIG. 3, the UWB antennas 4*a* provided on the panels 4*g*2, 4*g*4 are not shown. In this example, the child transceiver 4 has five UWB antennas 4*a* on the five surfaces thereof. The primary display screen 42*b*1 shows data representing communication parameters, for example, in a two-dimensional graph. The secondary display screen 42*b*2 shows data representing communication parameters, for example, by numerical values, which can be displayed by, for example, a seven-segment display device. Any suitable number of, and any suitable positions of the UWB antennas 4a may be utilized depending on the actual implementation of the system.

Graphical Display of Communication Parameters

Graphical display of the various relationships between communication parameters will now be described referring to FIGS. 4-15. These graphical representations are visually provided to the user of the system, where one communication parameter corresponds to a horizontal axis in a plot, and another communication parameter corresponds to a vertical axis in the plot, resulting in a two-dimensional graphical representation of the two communication parameters. The graphical representations are shown to the user in the primary display screens 32b1 and 42b1 in the monitor unit 32. In this specification, a "partner transceiver" means a child transceiver when the transceiver at issue is a parent transceiver. Conversely, a "partner transceiver" means a parent transceiver when the transceiver at issue is a child transceiver. In the following description, what is applicable to the parent transceivers 3 may be similarly applicable to the child transceivers 4. Such similarity between the parent/child transceivers 3 and 4 is shown by the expression, "[element in parent] (or [element in child])" below.

Figure 4:
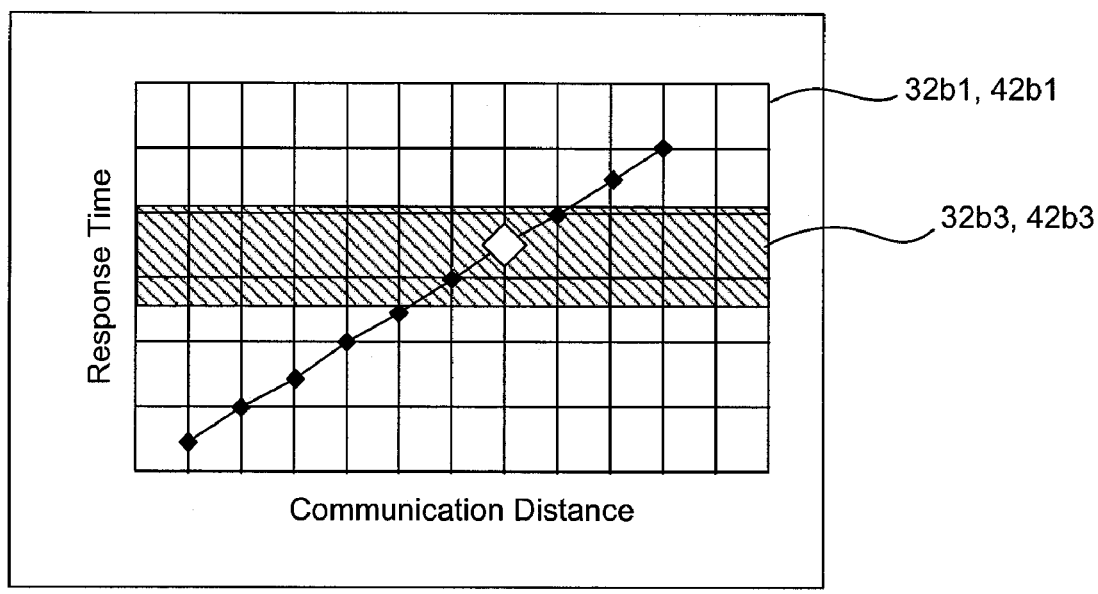
FIG. 4 illustrates an example of the primary display screen showing a communication distance, and a communication response time.

FIG. 4 illustrates an example of the primary display screen showing a communication distance, and a communication response time. The primary display screen 32b1 (or 42b1) shown in FIG. 4 indicates a communication distance between the transceiver at issue and its corresponding partner transceiver in the horizontal axis, and a communication response time necessary for communicating between the transceiver at issue and its corresponding partner transceiver in the vertical axis. The relationship between the communication distance and the communication response time is plotted as a two-dimensional graph on the display screen. The primary display screen 32b1 (or 42b1) also indicates a reference area 32b3 (or 42b3), which corresponds to, for example, a desired range of at least one of the two communication parameters. Such a desired range of at least one of the two communication parameters is used for optimizing the communication parameters. The reference area 32b3 (or 42b3) may indicate whether the parameter in question is within a predetermined range (e.g., a desired range) by using different colors, different brightness, flashing indication, and other suitable visualized indication.

The communication unit 30 (or 40) of the transceiver at issue sends a continuous pulse signal to the partner transceiver. The communication unit 30 (or 40) receives and processes a response signal sent by the partner transceiver to the transceiver at issue in response to the continuous pulse signal.

The processor 31 (or 41) (e.g., the controller 3e or 4e) calculates the communication distance between the transceiver at issue and its corresponding partner transceiver based on the response time between the transmission time of the continuous pulse signal, and the reception time of the response signal. Based on the calculation, the processor 31 (or 41) obtains communication parameters such as the response time, and the communication distance, and then obtains the relationship between the response time, and the communication distance. The processor 31 (or 41) stores the obtained relationship in the memory 3f (or 4f).

In the monitor unit 32 (or 42), the controller 32a (or 42a) retrieves display data for two-dimensional graphical representation on the primary display screen 32b1 (or 42b1). This two-dimensional graph shows the communication distance in the horizontal axis, and the response time in the vertical axis. In response to a display control command by the controller 3e (or 4e), the controller 32a (or 42a) accesses to the memory 3f (or 4f) to retrieve data representing the relationship between the communication distance and the response time, and displays a graph representing the relationship between the communication distance and the response time on the display 32b (or 42b) as shown in FIG. 4.

The controller 32a (or 42a) displays the reference area 32b3 (or 42b3) on the display 32b (or 42b) as well. Example embodiments described below referring to FIGS. 5-13 also indicate this reference area 32b3 (or 42b3).

Figure 5:
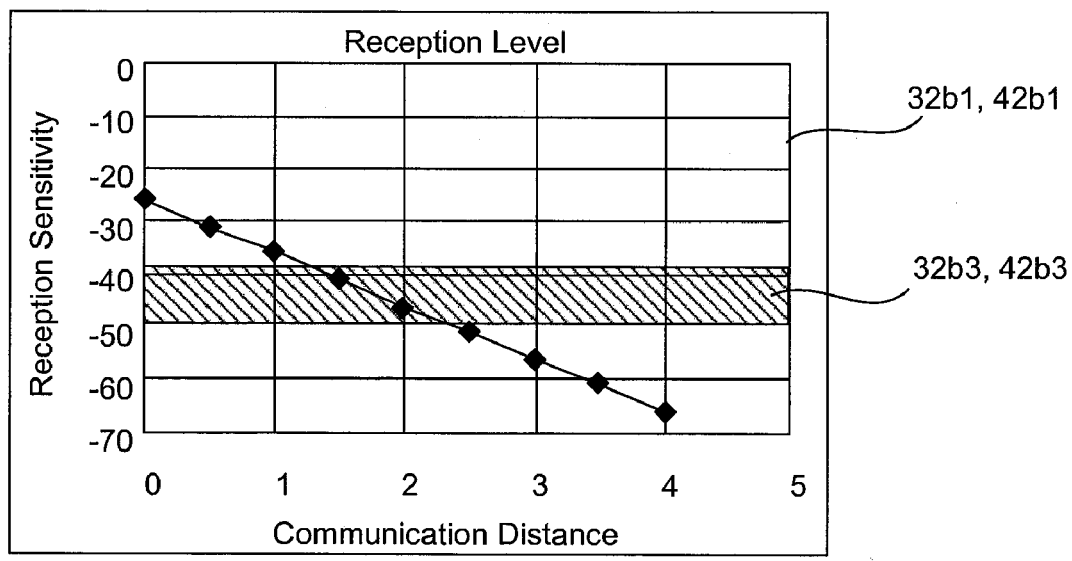
FIG. 5 illustrates an example of the primary display screen showing a communication distance, and a reception sensitivity.

FIG. 5 illustrates an example of the primary display screen showing a communication distance, and a reception sensitivity. The primary display screen 32b1 (or 42b1) shown in FIG. 5 indicates a communication distance between the transceiver at issue and its corresponding partner transceiver in the horizontal axis, and a reception sensitivity at the transceiver at issue in the vertical axis. The relationship between the communication distance and the reception sensitivity is plotted as a two-dimensional graph on the display screen. From the graph shown in FIG. 5, one can know the maximum communication distance based on the reception sensitivity.

Similar to the case of FIG. 4, the communication unit 30 (or 40) of the transceiver at issue sends a continuous pulse signal to the partner transceiver. The communication unit 30 (or 40) receives and processes a response signal sent by the partner transceiver to the transceiver at issue in response to the continuous pulse signal.

The processor 31 (or 41) (e.g., the controller 3e or 4e) calculates the communication distance between the transceiver at issue and its corresponding partner transceiver based on the response time between the transmission time of the continuous pulse signal, and the reception time of the response signal. Also, the processor 31 (or 41) (e.g., the controller 3e or 4e) calculates the reception sensitivity based on a reception level of the response signal corresponding to the communication distance. Based on the calculation, the processor 31 (or 41) obtains communication parameters such as the communication distance and the reception sensitivity, and then obtains the relationship between the communication distance and the reception sensitivity. The processor 31 (or 41) stores the obtained relationship in the memory 3f (or 4f).

In the monitor unit 32 (or 42), the controller 32a (or 42a) retrieves display data for two-dimensional graphical representation on the primary display screen 32b1 (or 42b1). This two-dimensional graph shows the communication distance in the horizontal axis, and the reception sensitivity in the vertical axis. In response to a display control command by the controller 3e (or 4e), the controller 32a (or 42a) accesses to the memory 3f (or 4f) to retrieve data representing the relationship between the communication distance and the reception sensitivity, and displays a graph representing the relationship between the communication distance and the reception sensitivity on the display 32b (or 42b) as shown in FIG. 5.

Figure 6:
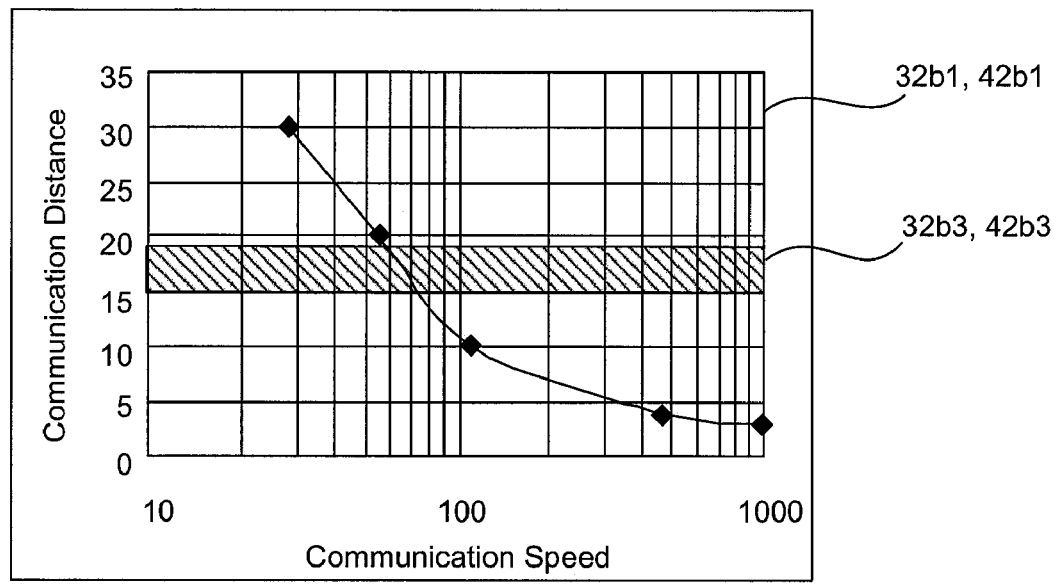
FIG. 6 illustrates an example of the primary display screen showing a communication speed, and a communication distance.

FIG. 6 illustrates an example of the primary display screen showing a communication speed, and a communication distance. The primary display screen 32b1 (or 42b1) shown in FIG. 6 indicates a communication speed in the horizontal axis, and a communication distance in the vertical axis. The relationship between the communication speed, and the communication distance is plotted as a two-dimensional graph on the display screen. From the graph shown in FIG. 6, one can know the maximum communication distance based on the communication speed since the communication distance decreases as the communication speed increases.

Similar to the case of FIG. 4, the communication unit 30 (or 40) of the transceiver at issue sends a continuous pulse signal to the partner transceiver. The communication unit 30 (or 40)

receives and processes a response signal sent by the partner transceiver to the transceiver at issue in response to the continuous pulse signal.

The processor 31 (or 41) (e.g., the controller 3e or 4e) calculates the communication distance between the transceiver at issue and its corresponding partner transceiver based on the response time between the transmission time of the continuous pulse signal, and the reception time of the response signal. Also, the processor 31 (or 41) (e.g., the controller 3e or 4e) calculates the communication speed corresponding to the communication distance. Based on the calculation, the processor 31 (or 41) obtains communication parameters such as the communication distance and the reception sensitivity, and then obtains the relationship between the communication distance and the reception sensitivity. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship on the display 32b (or 42b) as shown in FIG. 6.

Figure 7:
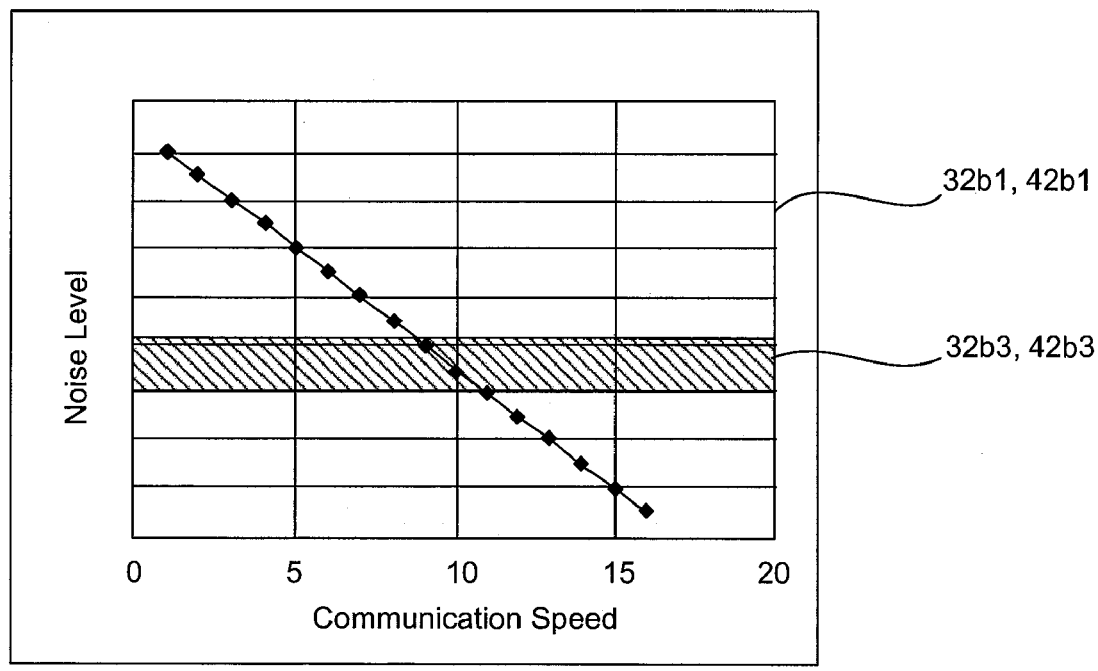
FIG. 7 illustrates an example of the primary display screen showing a communication speed, and a noise level.

FIG. 7 illustrates an example of the primary display screen showing a communication speed, and a noise level. The primary display screen 32b1 (or 42b1) shown in FIG. 7 indicates a communication speed in the horizontal axis, and a noise level in the vertical axis. The relationship between the communication speed, and the noise level is plotted as a two-dimensional graph on the display screen. From the graph shown in FIG. 7, one can know the maximum communication speed with respect to the actual noise level when the packet size and the communication distance are fixed.

The communication unit 30 (or 40) generates data representing the communication speed (communication speed data), and its corresponding data representing the noise level (noise level data).

The processor 31 (or 41) calculates and obtains communication parameters such as the communication speed and the noise level, and then obtains the relationship between the communication speed and the noise level. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship on the display 32b (or 42b) as shown in FIG. 7.

The above-described display examples shown in FIGS. 4-7 can be utilized for either of the MB-OFDM system and the DS-CDMA system.

Figure 8:
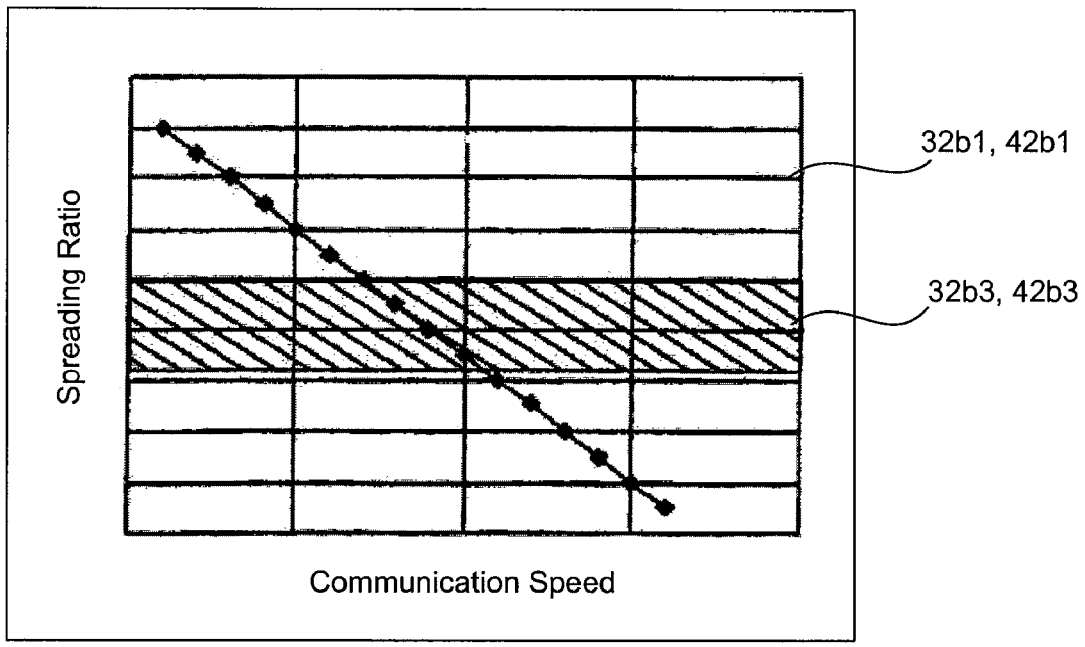
FIG. 8 illustrates an example of the primary display screen showing a communication speed, and a spreading ratio.

FIG. 8 illustrates an example of the primary display screen showing a communication speed, and a spreading ratio. The primary display screen 32b1 (or 42b1) shown in FIG. 8 indicates a communication speed in the horizontal axis, and a spreading ratio in the vertical axis. The relationship between the communication speed, and the spreading ratio is plotted as a two-dimensional graph on the display screen. From the graph shown in FIG. 8, one can know a range of the optimum spreading ratio with respect to the desired communication speed for the DS-CDMA system.

The communication unit 30 (or 40) generates data representing the communication speed (communication speed data), and its corresponding data representing the spreading ratio (spreading ratio data).

The processor 31 (or 41) calculates and obtains communication parameters such as the communication speed and the spreading ratio, and then obtains the relationship between the communication speed and the spreading ratio. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship on the display 32b (or 42b) as shown in FIG. 8.

Figure 9:
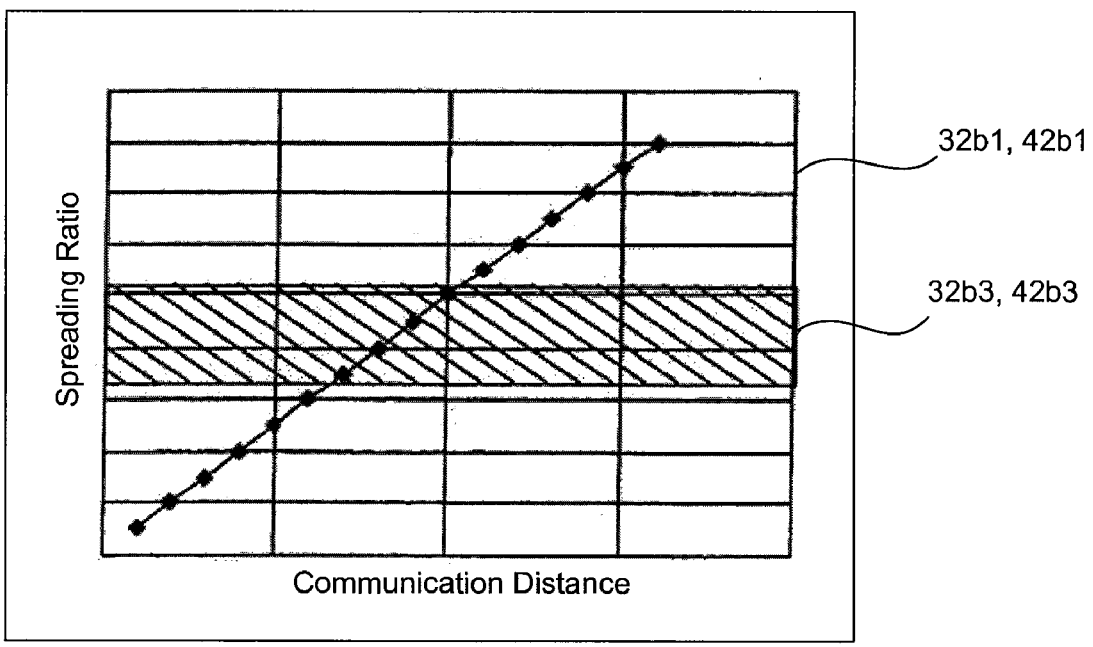
FIG. 9 illustrates an example of the primary display screen showing a communication distance, and a spreading ratio.

FIG. 9 illustrates an example of the primary display screen showing a communication distance, and a spreading ratio. The primary display screen 32b1 (or 42b1) shown in FIG. 9 indicates a communication distance in the horizontal axis, and a spreading ratio in the vertical axis. The relationship between the communication distance, and the spreading ratio is plotted as a two-dimensional graph on the display screen. From the graph shown in FIG. 9, one can know a range of the optimum spreading ratio with respect to the desired communication distance for the DS-CDMA system.

The communication unit 30 (or 40) generates data representing the communication distance (communication distance data), and its corresponding data representing the spreading ratio (spreading ratio data).

The processor 31 (or 41) calculates and obtains communication parameters such as the communication distance and the spreading ratio, and then obtains the relationship between the communication distance and the spreading ratio. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship between the communication distance and the spreading ratio based on the retrieved relationship on the display 32b (or 42b) as shown in FIG. 9.

Figure 10:
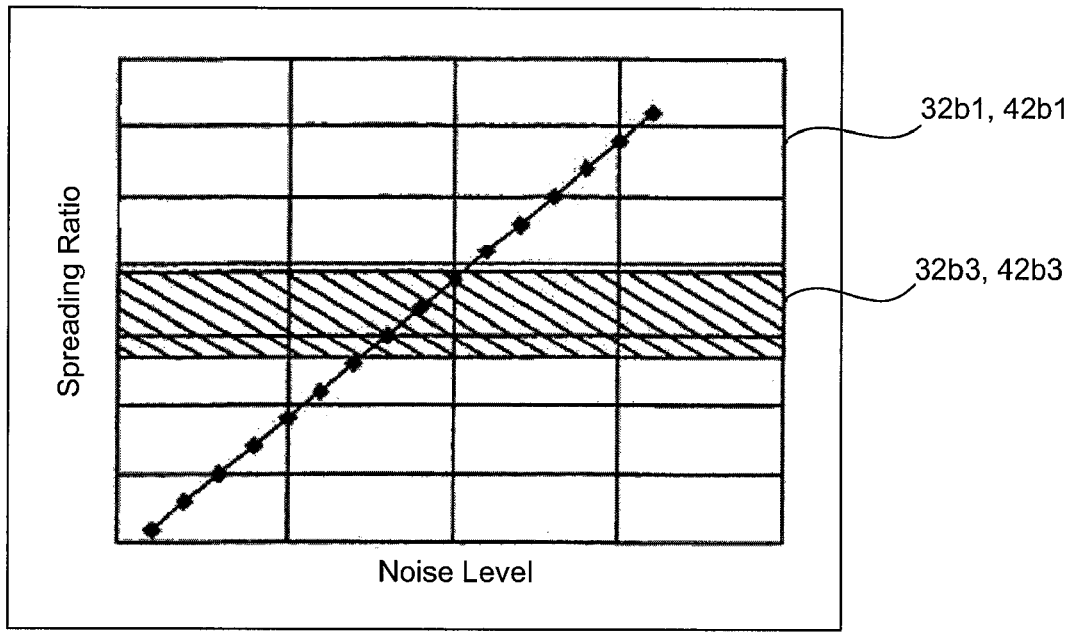
FIG. 10 illustrates an example of the primary display screen showing a noise level, and a spreading ratio.

FIG. 10 illustrates an example of the primary display screen showing a noise level, and a spreading ratio. The primary display screen 32b1 (or 42b1) shown in FIG. 10 indicates a noise level in the horizontal axis, and a spreading ratio in the vertical axis. The relationship between the noise level and the spreading ratio is plotted as a two-dimensional graph on the display screen. From the graph shown in FIG. 10, one can know a range of the optimum spreading ratio with respect to the desired noise resistance for the DS-CDMA system.

The communication unit 30 (or 40) generates data representing the noise level (noise level data), and its corresponding data representing the spreading ratio (spreading ratio data).

The processor 31 (or 41) calculates and obtains communication parameters such as the noise level and the spreading ratio, and then obtains the relationship between the noise level and the spreading ratio. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship between the noise level and the spreading ratio based on the retrieved relationship on the display 32b (or 42b) as shown in FIG. 10.

The above-described examples shown in FIGS. 8-10 are used for displays of the DS-CDMA system.

Figure 11:
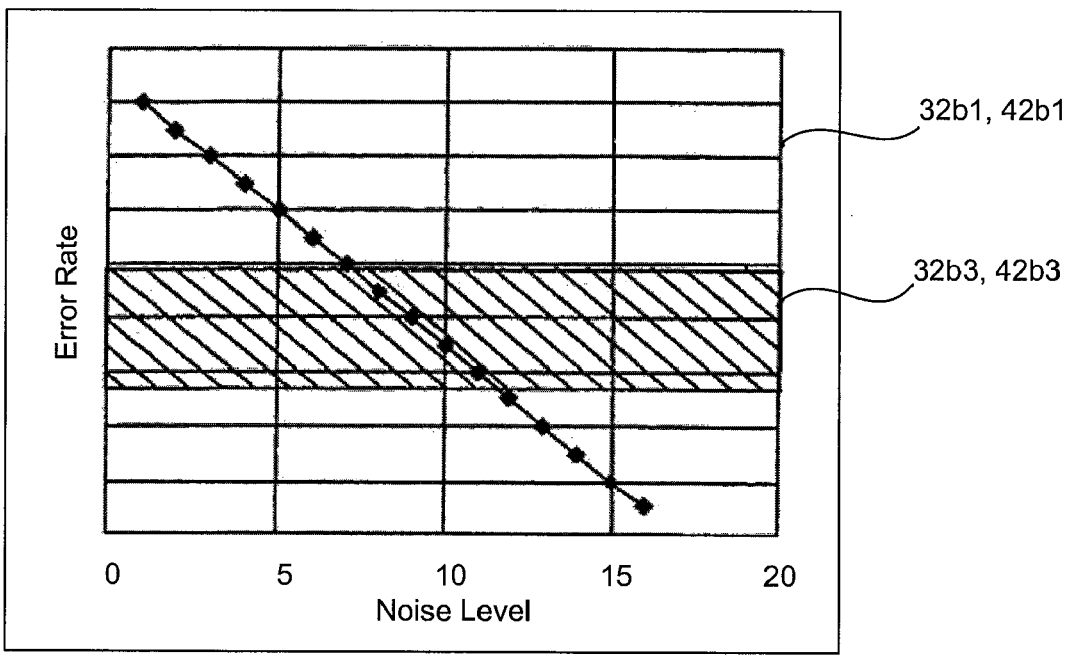
FIG. 11 illustrates an example of the primary display screen showing a noise level, and an error rate.

FIG. 11 illustrates an example of the primary display screen showing a noise level, and an error rate. The primary display screen 32b1 (or 42b1) shown in FIG. 11 indicates a noise level in the horizontal axis, and an error rate in the vertical axis. The relationship between the noise level and the error rate is plotted as a two-dimensional graph on the display screen. From the graph shown in FIG. 11, one can know a necessary noise level in order to achieve a desired reliability (e.g., an error rate for transmitted packets) when other conditions such as the packet length are fixed.

The communication unit 30 (or 40) generates data representing the noise level (noise level data), and its corresponding data representing the error rate (error rate data).

The processor 31 (or 41) calculates and obtains communication parameters such as the noise level and the error rate, and then obtains the relationship between the noise level and the error rate. The processor 31 (or 41) stores the obtained relationship in the memory $3f$ (or $4f$).

In response to a display control command by the controller $3e$ (or $4e$), the controller $32a$ (or $42a$) accesses to the memory $3f$ (or $4f$) to retrieve data representing the relationship, and displays a two-dimensional graph representing the relationship between the noise level and the error rate based on the retrieved relationship on the display $32b$ (or $42b$) as shown in FIG. 11.

Figure 12:
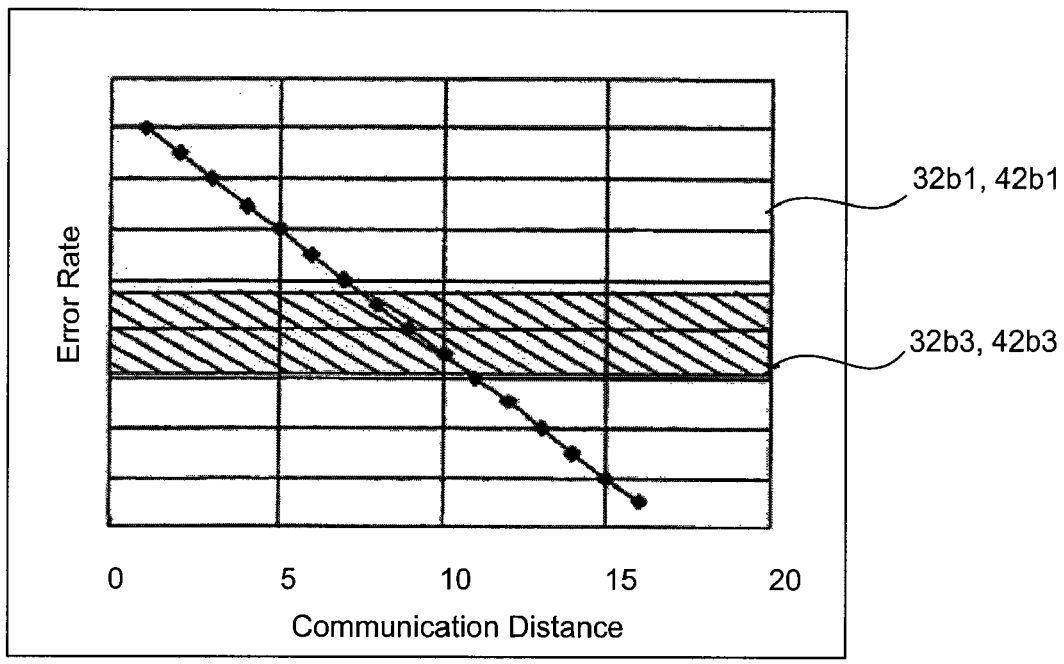
FIG. 12 illustrates an example of the primary display screen showing a communication distance, and an error rate.

FIG. 12 illustrates an example of the primary display screen showing a communication distance, and an error rate. The primary display screen $32b1$ (or $42b1$) shown in FIG. 12 indicates a communication distance in the horizontal axis, and an error rate in the vertical axis. The relationship between the communication distance and the error rate is plotted as a two-dimensional graph on the display screen. From the graph shown in FIG. 12, one can know a necessary communication distance in order to achieve a desired reliability (e.g., an error rate for transmitted packets) when other conditions such as the packet length are fixed.

The communication unit 30 (or 40) generates data representing the communication distance (communication distance data), and its corresponding data representing the error rate (error rate data).

The processor 31 (or 41) calculates and obtains communication parameters such as the communication distance and the error rate, and then obtains the relationship between the communication distance and the error rate. The processor 31 (or 41) stores the obtained relationship in the memory $3f$ (or $4f$).

In response to a display control command by the controller $3e$ (or $4e$), the controller $32a$ (or $42a$) accesses to the memory $3f$ (or $4f$) to retrieve data representing the relationship, and displays a two-dimensional graph representing the relationship between the communication distance and the error rate based on the retrieved relationship on the display $32b$ (or $42b$) as shown in FIG. 12.

Figure 13:
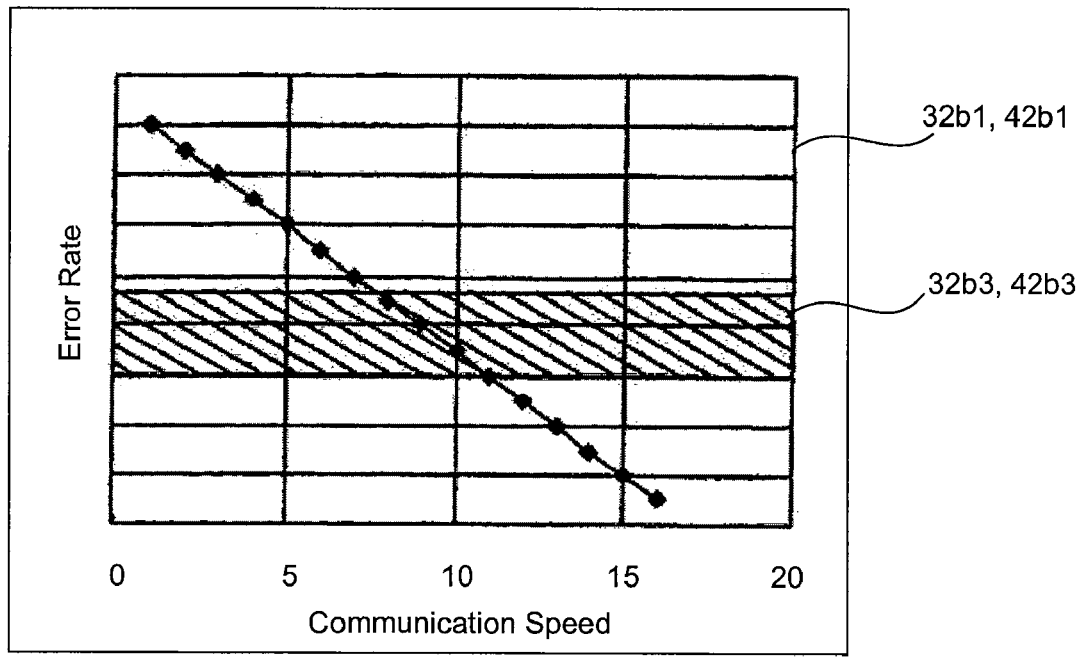
FIG. 13 illustrates an example of the primary display screen showing a communication speed, and an error rate.

FIG. 13 illustrates an example of the primary display screen showing a communication speed, and an error rate. The primary display screen $32b1$ (or $42b1$) shown in FIG. 13 indicates a communication speed in the horizontal axis, and an error rate in the vertical axis. The relationship between the communication speed and the error rate is plotted as a two-dimensional graph on the display screen. From the graph shown in FIG. 13, one can know a necessary communication speed in order to achieve a desired reliability (e.g., an error rate for transmitted packets) when other conditions such as the packet length are fixed.

The communication unit 30 (or 40) generates data representing the communication speed (communication speed data), and its corresponding data representing the error rate (error rate data).

The processor 31 (or 41) calculates and obtains communication parameters such as the communication speed and the error rate, and then obtains the relationship between the communication speed and the error rate. The processor 31 (or 41) stores the obtained relationship in the memory $3f$ (or $4f$).

In response to a display control command by the controller $3e$ (or $4e$), the controller $32a$ (or $42a$) accesses to the memory $3f$ (or $4f$) to retrieve data representing the relationship, and displays a two-dimensional graph representing the relationship between the communication speed and the error rate based on the retrieved relationship on the display $32b$ (or $42b$) as shown in FIG. 13.

The above-described examples shown in FIGS. 11-13 are used for displays of either the MB-OFDM system or the DS-CDMA system.

Figure 14:
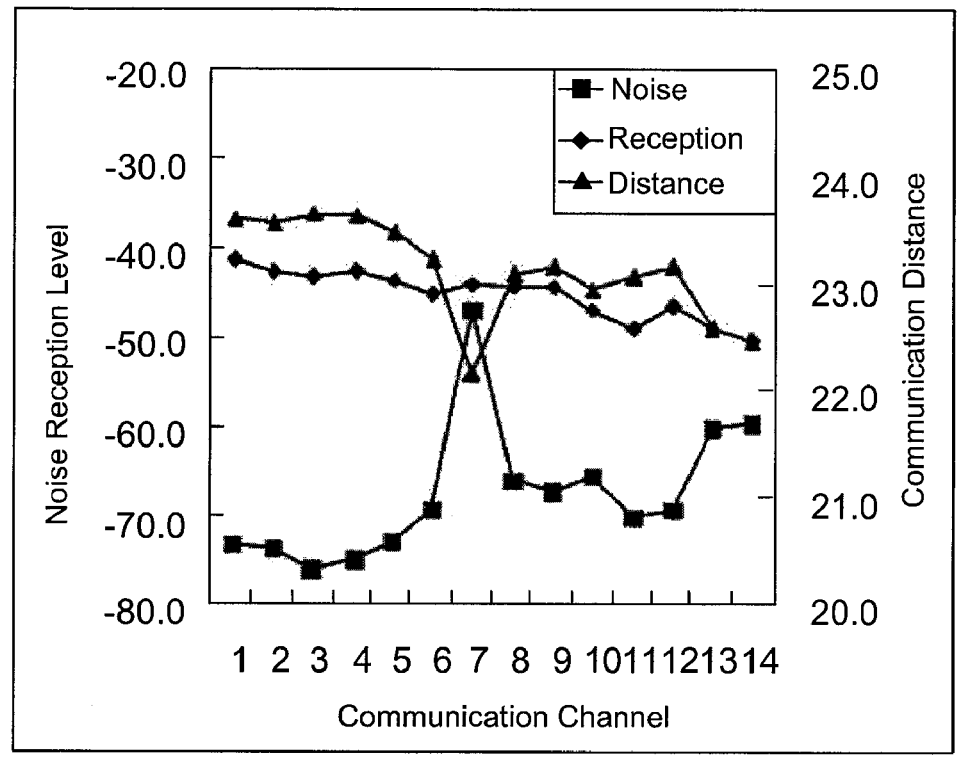
FIG. 14 illustrates an example of the primary display screen showing a communication channel, a noise reception level, and a communication distance.

FIG. 14 illustrates an example of the primary display screen showing a communication channel, a noise reception level, and a communication distance. The primary display screen $32b1$ (or $42b1$) shown in FIG. 14 indicates a communication channel in the horizontal axis, a noise reception level in the left-hand side vertical axis, and the communication distance in the right-hand side vertical axis. The relationship between the communication channel, the noise reception level, and the communication distance is plotted as a two-dimensional graph on the display screen.

In a multi-channel system, the communication distance tends to decrease as the frequency of the channel to be used increases. In such a case, the maximum communication distance for each channel can be compensated based on the corresponding noise level by indicating the maximum communication distance for each channel to be used. The plot shown in FIG. 14 can be used for such compensation.

The primary display screen $32b1$ (or $42b1$) also indicates a reference area $32b3$ (or $42b3$), which corresponds to, for example, a desired range of at least one of the two communication parameters. Such a desired range of at least one of the two communication parameters is used for optimizing the communication parameters. The reference area $32b3$ (or $42b3$) may indicate whether the parameter in question is within a predetermined range (e.g., a desired range) by using different colors, different brightness, flashing indication, and other suitable visualized indication.

The communication unit 30 (or 40) generates data representing the noise reception level (noise reception level data), data representing the communication distance (communication distance data), and their corresponding data representing the communication channel to be used (communication channel data).

The processor 31 (or 41) calculates and obtains communication parameters such as the noise reception level data, the communication distance, and the communication channel data, and then obtains the relationship between these parameters. The processor 31 (or 41) stores the obtained relationship in the memory $3f$ (or $4f$).

In response to a display control command by the controller $3e$ (or $4e$), the controller $32a$ (or $42a$) accesses to the memory $3f$ (or $4f$) to retrieve data representing the relationship, and displays a two-dimensional graph representing the relationship between the noise reception level data, the communication distance, and the communication channel data based on the retrieved relationship on the display $32b$ (or $42b$) as shown in FIG. 14.

Figure 15:
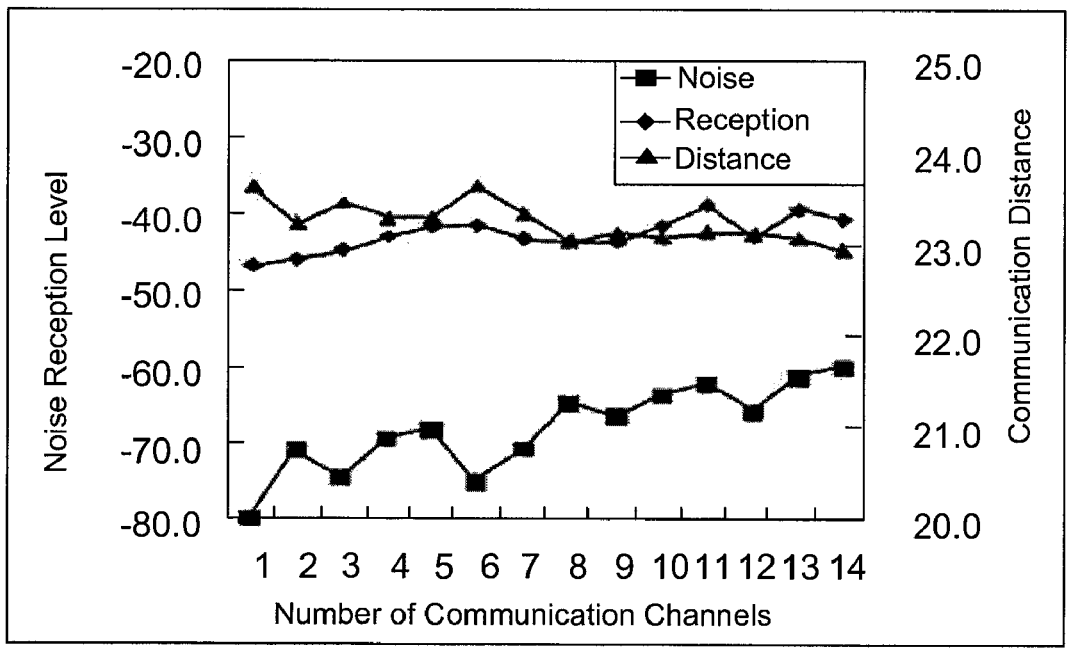
FIG. 15 illustrates an example of the primary display screen showing the number of the communication channels, a noise reception level, and a communication distance.

FIG. 15 illustrates an example of the primary display screen showing the number of the communication channels, a noise reception level, and a communication distance. The primary display screen $32b1$ (or $42b1$) shown in FIG. 15 indicates the number of the communication channels in the horizontal axis, a noise reception level in the left-hand side vertical axis, and the communication distance in the right-hand side vertical axis. The relationship between the communication channel, the noise reception level, and the communication distance is plotted as a two-dimensional graph on the display screen.

In a multi-channel system, the maximum communication distance can be represented by the number of the communication channels to be used. By measuring the accumulated noise level of the communication channels, the maximum communication distance for all channels can be compensated based on the corresponding accumulated noise level. The plot shown in FIG. 15 can be used for such compensation.

The communication unit 30 (or 40) generates data representing the noise reception level (noise reception level data), data representing the communication distance (communication distance data), and their corresponding data representing the number of the communication channels to be used (communication channel number data).

The processor 31 (or 41) calculates and obtains communication parameters such as the noise reception level data, the communication distance, and the communication channel number data, and then obtains the relationship between these parameters. The processor 31 (or 41) stores the obtained relationship in the memory 3f (or 4f).

In response to a display control command by the controller 3e (or 4e), the controller 32a (or 42a) accesses to the memory 3f (or 4f) to retrieve data representing the relationship, and displays a two-dimensional graph representing the relationship between the noise reception level data, the communication distance, and the communication channel number data based on the retrieved relationship on the display 32b (or 42b) as shown in FIG. 15.

The above-described examples shown in FIGS. 14-15 are used for displays of the MB-OFDM system.

Figure 16A:
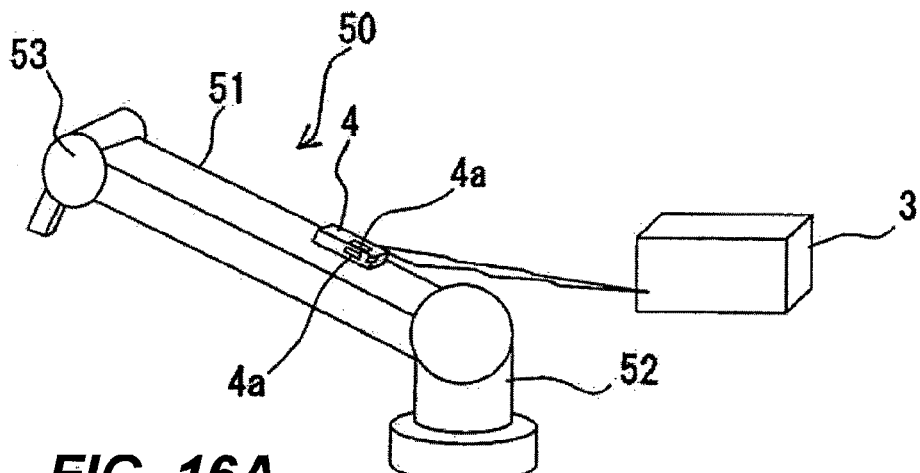
FIG. 16A illustrates an example of a robot arm manipulator.
Figure 16B:
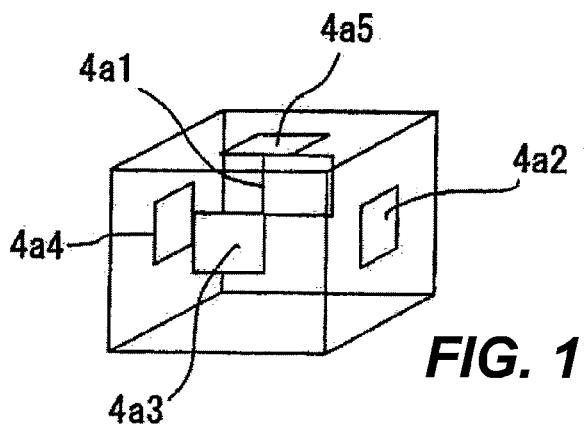
FIG. 16B illustrates a configuration of the UWB antennas provided on the child transceiver 4.
Figure 16C:
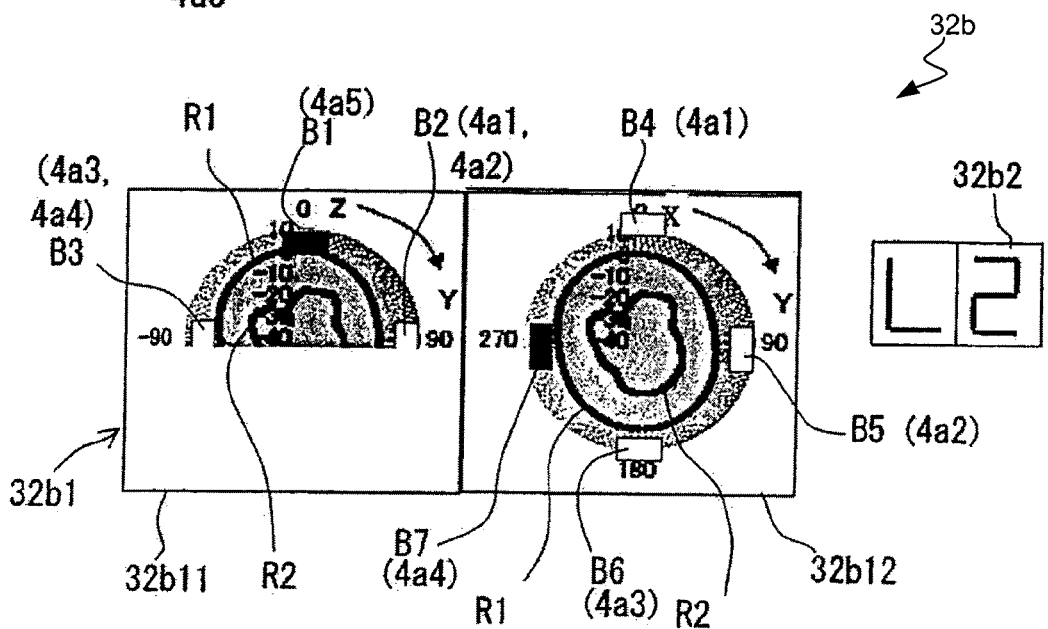
FIG. 16C illustrates an example screen of the display of the monitor in the parent transceiver.

Referring to FIGS. 16A-16C, an example embodiment of the parent and child transceivers 3 and 4 will be now described. FIG. 16A illustrates an example of a robot arm manipulator 50. The robot arm includes a driving unit 52 at one end, and a manipulating unit 53 at another end. The manipulating unit 53 can rotate, and move up and down, and from side to side driven by the driving unit 52. The parent transceiver 3 is provided in a fixed position appropriately away from the robot arm 50.

The child transceiver 4 is provided on an arm axis 51 with its bottom surface being attached to the axis 51. The child transceiver 4 moves within the xyz planes of FIGS. 16A-16C as the arm axis 51 moves.

FIG. 16B illustrates a configuration of the UWB antennas provided on the child transceiver 4. As shown in FIG. 16B, the child transceiver 4 has five UWB antennas 4a1-4a5 (collectively, 4a) on five surfaces except for the bottom surface which faces the arm axis 51. When the arm axis 51 is parallel to the positive direction of the z axis, the UWB antennas 4a1-4a5 communicate with the parent transceiver 3, and the parent transceiver 3 indicates a communication parameter corresponding to the antennas. When the arm axis 51 is tilted by 45 degrees toward the positive direction of the x axis, the UWB antenna 4a4 communicates with the parent transceiver 3, and the parent transceiver 3 indicates a communication parameter corresponding to the antenna.

FIG. 16C illustrates an example screen of the display 32b of the monitor 32 in the parent transceiver 3. The primary display screen 32b1 of the display 32b includes two separate areas corresponding to two-dimensional graphs 32b11, and 32b12.

The left-hand side area 32b11 shows a display screen within the z-y plain (the arm axis 51 is in the horizontal plain). Indication boxes B1; B2; and B3 in the area 32b11 correspond to the UWB antenna 4a5; the UWB antennas 4a1 and 4a2; and the UWB antennas 4a3 and 4a4, respectively. The boxes B1; B2; and B3 correspond to the coordinate angles of 0 degree, 90 degrees, and −90 degrees, respectively.

The right-hand side area 32b12 shows a display screen within the x-y plain (the arm axis 51 is in the vertical plain). Indication boxes B4; B5; B6; and B7 in the area 32b12 correspond to the UWB antenna 4a1; the UWB antennas 4a2; the UWB antenna 4a3; and the UWB antennas 4a4, respectively. The boxes B4; B5; B6; and B7 correspond to the coordinate angles of 0 degree, 90 degrees, 180 degrees, and 270 degrees, respectively.

In the indication boxes B1-B7, the solid (i.e., black in the drawing) box indicates that transmission from the corresponding one of the UWB antennas 4a1-4a5 is being received. The blank (i.e., white in the drawing) box indicates that no transmission is being received. The plot R1 represents a reception level generated by transmission from the child transceiver 4 at the parent transceiver 3. The plot R2 represents a noise level at the parent transceiver 3.

The box B1 (at "0") corresponds to the horizontal position of the arm axis 51 is zero. The box B2 (at "90") corresponds to the horizontal position of the arm axis 51 is 90 degrees in a clockwise direction (i.e., the manipulating unit 53 of the arm axis 51 is rotated 90 degrees in a clockwise direction with respect to the driving unit 52). The box B3 (at "−90") corresponds to the horizontal position of the arm axis 51 is 90 degrees in a counterclockwise direction (i.e., the manipulating unit 53 of the arm axis 51 is rotated 90 degrees in a counterclockwise direction with respect to the driving unit 52).

In the indication boxes B1-B3, the solid (i.e., black in the drawing) box indicates that transmission from the corresponding one of the UWB antennas 4a is being received. The blank (i.e., white in the drawing) box indicates that no transmission is being received. The plot R1 represents a reception level generated by transmission from the child transceiver 4 at the parent transceiver 3. The plot R2 represents a noise level at the parent transceiver 3.

In the left-hand side area 32b11, the box B3 is illuminated (e.g., in red), and thus, shows that transmission from the UWB antennas 4a3, and 4a4 is being received. In the right-hand side area 32b12, the box B7 is illuminated (e.g., in red), and thus, shows that transmission from the UWB antennas 4a4 is being received. The display 32b also includes numerical indication which shows a reception level by a numerical value as shown by the secondary display screen 32b2.

As shown in FIG. 16C, the display 32b shows multiple areas (e.g., 32b11 and 32b12) corresponding to two-dimensional graphs. In this example, each of these two-dimensional graphs shows data representing a relationship between two types of parameters (signal and noise reception levels) of UWB transmission performed by a corresponding one of the multiple antennas 4a1-4a5.

Some of the example embodiment of the invention may be implemented for both MB-OFDM systems and DS-CDMA systems.

According to the example embodiments of the invention, for example, in a manufacturing factory, a large number of control devices can communicated with the centralized control unit properly, resulting in high operation efficiency.

UWB communications have an advantage that the system can share frequency spectrums with other communication devices because they transmit a low power RF signal using a very wide bandwidth. In addition, the data is transmitted in a pulse signal, and thus, it may be unaffected by multipath propagation, or fading. As a result, UWB communications are desirable for control system applications used in, for example, manufacturing factories.

According to the example embodiments of the invention, various relationships between communication parameters can be visually monitored, or graphically displayed. As such, optimum communication conditions for UWB transceivers can be easily and precisely adjusted. Transceivers according to the example embodiments of the invention can contribute to high operation efficiency of the control system by utilizing various advantages of UWB communications even when there exist electromagnetic noises or fading effects which tend to cause communication problems.

CONCLUSION

Although the foregoing invention has been described in some detail for purposes of clarity of understanding, it will be apparent that certain changes and modifications may be practiced without departing from the spirit and scope of the invention as defined in the claims. Further, features of the invention described herein may be provided alone or in any combination.

What is claimed is:

1. An apparatus for communicating using UWB (ultra wideband) transmission, comprising:
    a transmitter configured to transmit the UWB transmission;
    a receiver configured to receive the UWB transmission; and
    a monitor unit configured to present data representing a relationship between two types of parameters of the received UWB transmission;
    wherein the relationship is selected from a group consisting of
    a relationship between a communication response time, and a communication distance,
    a relationship between a communication distance, and a reception sensitivity,
    a relationship between a communication speed, and a communication distance,
    a relationship between a communication speed, and a noise level,
    a relationship between a communication speed, and a spreading ratio,
    a relationship between a communication distance, and a spreading ratio,
    a relationship between a noise level, and a spreading ratio,
    a relationship between a noise level, and an error rate,
    a relationship between a communication distance, and an error rate,
    a relationship between a communication speed, and an error rate,
    a relationship between a communication channel, and a noise level,
    a relationship between a communication channel, and a communication distance,
    a relationship between a number of communication channels, and a noise level, and
    a relationship between a number of communication channels, and a distance.

2. The apparatus of claim 1, wherein the monitor unit includes a display configured to visually display the data.

3. The apparatus of claim 2, further comprising:
    a processor configured to obtain the data from the received UWB transmission.

4. The apparatus of claim 3, wherein the processor includes
    a signal processor configured to obtain the relationship from the UWB transmission received by the receiver,
    a memory configured to store the data representing the relationship, and
    a controller configured to control the memory.

5. The apparatus of claim 4, wherein the monitor unit includes a controller configured to control the display.

6. The apparatus of claim 1, wherein the display shows the data in one of a one-dimensional graph, a two-dimensional graph, or a three-dimensional graph.

7. An apparatus for communicating using UWB (ultra wideband) transmission, comprising:
    a transmitter configured to transmit the UWB transmission;
    a receiver configured to receive the UWB transmission; and
    a monitor unit configured to present data representing a relationship between two types of parameters of the received UWB transmission;
    wherein
    the monitor unit includes a display configured to visually display the data,
    the display shows the data in a two-dimensional graph in which one of the two types of parameters is indicated along a horizontal axis, and the other of the two types of parameters along a vertical axis, and
    the display shows in the two-dimensional graph a reference area which corresponds to a desired range of at least one of the two types of parameters for optimal setting of the at least one of the two types of parameters.

8. The apparatus of claim 7, wherein
    the display shows in the two-dimensional graph the two types of parameters along two vertical axes which are located at a right-hand side of the horizontal axis, and a left-hand side of the horizontal axis.

9. The apparatus of claim 7, further comprising:
    a processor configured to obtain the data from the received UWB transmission.

10. The apparatus of claim 9, wherein the processor includes
    a signal processor configured to obtain the relationship from the UWB transmission received by the receiver,
    a memory configured to store the data representing the relationship, and
    a controller configured to control the memory.

11. The apparatus of claim 10, wherein the monitor unit includes a controller configured to control the display.

12. The apparatus of claim 7, wherein the display shows the data in one of a one-dimensional graph, a two-dimensional graph, or a three-dimensional graph.

13. An apparatus for communicating using UWB (ultra wideband) transmission, comprising:
    a transmitter configured to transmit the UWB transmission;
    a receiver configured to receive the UWB transmission; and
    a monitor unit configured to present data representing a relationship between two types of parameters of the received UWB transmission;
    wherein
    the monitor unit includes a display configured to visually display the data,
    the display shows a plurality of two-dimensional graphs, and
    each of the plurality of two-dimensional graphs shows data representing a relationship between two types of parameters of UWB transmission performed by a corresponding one of multiple antennas.

14. The apparatus of claim 13, wherein
the display shows an indicator representing an antenna which is receiving the UWB transmission.

15. The apparatus of claim 13, wherein
the display shows a reception level and a noise level of the UWB transmission in each of the plurality of two-dimensional graphs.

16. The apparatus of claim 15, wherein
the display shows the reception level by a numerical value.

17. The apparatus of claim 13, further comprising:
a processor configured to obtain the data from the received UWB transmission.

18. The apparatus of claim 17, wherein the processor includes
a signal processor configured to obtain the relationship from the UWB transmission received by the receiver,
a memory configured to store the data representing the relationship, and
a controller configured to control the memory.

19. The apparatus of claim 18, wherein the monitor unit includes a controller configured to control the display.

20. The apparatus of claim 13, wherein the display shows the data in one of a one-dimensional graph, a two-dimensional graph, or a three-dimensional graph.

* * * * *